US007664054B2

(12) United States Patent
Adya et al.

(10) Patent No.: US 7,664,054 B2
(45) Date of Patent: Feb. 16, 2010

(54) NEIGHBOR LOCATION DISCOVERY WITH DIRECTIONAL ANTENNAS IN A MESH NETWORK

(75) Inventors: Atul Adya, Redmond, WA (US); Paramvir Bahl, Sammamish, WA (US); Jitendra D. Padhye, Redmond, WA (US); Alastair Wolman, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 633 days.

(21) Appl. No.: 11/091,641

(22) Filed: Mar. 28, 2005

(65) Prior Publication Data

US 2006/0215624 A1 Sep. 28, 2006

(51) Int. Cl.
*H04L 12/28* (2006.01)
*H04B 7/00* (2006.01)
*H04B 1/00* (2006.01)
*H04B 15/00* (2006.01)
*H04W 4/00* (2009.01)
*H04H 20/67* (2008.01)

(52) U.S. Cl. ............... 370/255; 370/338; 370/334; 370/339; 455/41.2; 455/63.4

(58) Field of Classification Search ............... 370/255, 370/338, 334, 339, 349, 350, 254; 455/41.2, 455/502, 67.11, 63.4, 66.1, 456.1
See application file for complete search history.

(56) References Cited

U.S. PATENT DOCUMENTS 6,850,502 B1 * 2/2005 Kagan et al. ............... 370/330
6,925,064 B2 * 8/2005 Hester et al. ............... 370/255
6,930,988 B2 * 8/2005 Koodli et al. ............... 370/331
7,075,902 B2 7/2006 El Batt
7,085,541 B2 * 8/2006 Redi et al. ............... 455/69

(Continued)

FOREIGN PATENT DOCUMENTS

WO  WO 03069937 A1  8/2003

OTHER PUBLICATIONS

Roy, Siuli, et al., "A Network-Aware MAC and Routing Protocol for Effective Load Balancing in Ad Hoc Wireless Networks with Directional Antenna," *ACM Mobihoc 2003*, Jun. 2003.

(Continued)

*Primary Examiner*—Nick Corsaro
*Assistant Examiner*—Un C Cho
(74) *Attorney, Agent, or Firm*—Wolf, Greenfield & Sacks, P.C.

(57) ABSTRACT

Disclosed is a Neighbor Location Discovery Protocol (NLDP) that determines the relative locations of the nodes in a mesh network. In one embodiment, NLDP can be implemented for an ad-hoc wireless network where the nodes are equipped with directional antennas and are not able to use GPS. While NLDP relies on nodes having at least two RF transceivers, it offers significant advantages over previously proposed protocols that employ only one RF transceiver. In NLDP antenna hardware is simple, easy to implement, and readily available. Further, NLDP exploits the host node's ability to operate simultaneously over non-overlapping channels to quickly converge on the neighbor's location. NLDP is limited by the range of the control channel, which operates in a omni-directional fashion. However, by choosing a low frequency band, high power, and low data rate, the range of the control channel can be increased to match the range on the data channel.

7 Claims, 6 Drawing Sheets

U.S. PATENT DOCUMENTS

| | | | |
|---|---|---|---|
| 2002/0172186 A1* | 11/2002 | Larsson | 370/349 |
| 2004/0203873 A1* | 10/2004 | Gray | 455/456.1 |
| 2005/0068930 A1* | 3/2005 | Choi et al. | 370/343 |
| 2006/0104232 A1* | 5/2006 | Gidwani | 370/328 |
| 2006/0198346 A1* | 9/2006 | Liu et al. | 370/338 |
| 2007/0297365 A1 | 12/2007 | Li et al. | |

OTHER PUBLICATIONS

Korakis, Thanasis, et al., "A MAC Protocol for Full Exploitation of Directional Antennas in Ad-hoc Wireless Networks," *ACM Mobihoc 2003*, Jun. 2003.

Nasipuri, A., et al., "A MAC Protocol for Mobile Ad Hoc Networks Using Directional Antennas," *IEEE GLOBECOM1999*, Nov. 2000, pp. 1214-1219.

Ramanathan, Ram, et al.,"Ad Hoc Networking with Directional Antennas: A Complete System Solution," *IEEE Journal on Selected Areas in Communications*, vol. 23, No. 3, Mar. 2005, pp. 1-26.

Kravets, Robin, et al., "Power Management Techniques for Mobile Communication," *Mobicom* 1998, Oct. 1998, pp. 157-168.

Yum, Tak-Shing, "Design Algorithms for Multihop Packet Radio Networks with Multiple Directional Antennas Stations," *IEEE Transactions on Communications*, vol. 40, No. 11, Nov. 1992, pp. 1716-1724.

European Search Report from European Application No. 06111038. 3, filed Mar. 13, 2006.

Wang Y. et al., Directional Collision Avoidance in Ad Hoc Networks, Performance Evaluation, Amsterdam, NL, vol. 58, No. 2-3, Nov. 2004, pp. 215-241, XP004579291.

Roy Choudhury R., et al., *Performance of Ad Hoc Routing Using Directional Antennas*, Ad Hoc Networks, Elsevier, vol. 3, No. 2, Mar. 2005, pp. 157-173, XP004718782.

Vasudevan et al., "On Neighbor Discovery in Wireless Networks with Directional Antennas", UMass Computer Science Technical Report 04-53, 2004, pp. 1-24, ftp://gaia.cs.umass.edu/pub/Vasudevan04_NeighborDiscovey.pdf Li et al., "Opportunities and Challenges for Mesh Networks Using Directional Antennas", Sep. 2005, 11 pages, http://www.cs.ucdavis.edu/~prasant/WIMESH/p13.pdf.

Jakllari et al., "An Integrated Neighbor Discovery and MAC Protocol for Ad Hoc Networks Using Directional Antennas", IEEE Transactions on Wireless Communications, vol. 6, No. 3, Mar. 2007, pp. 1-12, http://www.cs.ucr.edu/~krish/Jakllari_directional.pdf.

Huang et al., "A Busy-Tone Based Directional MAC Protocol for Ad Hoc Networks", Dept. of Computer and Information Sciences, University of Delaware, Newark, DE, Oct. 2002, 6 pages, http://citeseerx.ist.psu.edu/viewdoc/summary?doi=10.1.1.20.5468.

Ko et al., "MAC protocols using directional antennas in IEEE 802.11 based ad hoc networks", Wirel. Commun. Mob. Comput., Apr. 27, 2007, 13 pages, http://uns.aiou.ac.kr/publications/paper/J2007/WCMC-scie-Apr07.pdf.

Nasipuri et al., "A Directionality based Location Discovery Scheme for Wireless Sensor Networks", WSNA'02, Sep. 28, 2002, Atlanta, Georgia, pp. 105-111, http://www.ece.uncc.edu/~anasipur/pubs/p030-nasipuri.pdf.

\* cited by examiner

NEIGHBOR LOCATION DISCOVERY WITH DIRECTIONAL ANTENNAS IN A MESH NETWORK

TECHNICAL FIELD

The present invention relates generally to computer networks and, more particularly, to multi-hop wireless mesh networks.

BACKGROUND OF THE INVENTION

Multi-hop wireless networks have been the subject of much study over the past decade. Much of the original work was motivated by military applications such as battlefield communications. More recently, however, some interesting commercial applications have emerged which has led to a surge of interest in building wireless neighborhood, or mesh, networks. One example is "community wireless mesh networks", where a multi-hop wireless network, perhaps based on the IEEE 802.11 standard, is used to provide "last-mile" broadband Internet access to peoples' homes.

There are several advantages to enabling such connectivity. For example, when enough neighbors cooperate and forward each others packets, they do not need to individually install dedicated wired Internet connections, but instead can share faster, more cost-effective gateways to the wired Internet that are distributed in their neighborhood. Packets dynamically find a route, hopping from one neighbor's node to another to reach the Internet through one of the gateways. Another advantage of multi-hop wireless mesh technology is that it enables new applications: for example, neighbors can cooperatively deploy distributed backup technology and hence do not have to worry about losing information due to a catastrophic disk failure. A third advantage is that the technology allows data created locally to be used locally without having to employ an Internet service provider. Neighborhood community mesh networks allow faster and easier dissemination of cached information and information that is relevant to the local community.

Unfortunately, simulation studies using actual suburban neighborhood topologies and off-the-shelf IEEE 802.11 wireless hardware have shown that multi-hop wireless mesh networks, where each router node has a single radio frequency transceiver, do not scale well. Further, the current state-of-art wireless LAN technology does not provide the range necessary for making such community networks possible.

To make community mesh networks viable, improvements are needed for both the range of individual links in the mesh network and for the overall capacity of the mesh network. Attaching multiple transceivers and directional antennas to each mesh router is one approach which has shown promise towards meeting these objectives. It should be noted that in the community networking scenario, router mobility is limited and battery capacity is not an issue because the mesh routers are placed in houses and can be plugged in to an electrical outlet.

The above approach is not however void of challenges. Specifically, for directional antennas to be used properly, the sending node needs to point its antenna in the direction of the destination node. To enable even longer-range communications, both the sending and the receiving nodes may need to have their directional antennas aimed properly in order for two routers to communicate. The questions are: 1) how does a sending node know where the destination node is?; and 2) how does the intended receiver know where the sending node is? There have been several attempts to date aimed at developing a neighbor discovery protocol, though each possesses substantial shortcomings.

The Nasipuri Discovery Protocol is designed for nodes with sectorized antennas, where each node in the network is equipped with M non-overlapping directional antennas each of which has the same beamwidth (360°/M) (see A. Nasipuri, S. Ye, J. You, and R. E. Hiromoto, "A MAC Protocol for Mobile Ad Hoc Networks Using Directional Antennas", *IEEE WCNC* 2000, September 2000). Each node is expected to maintain the same orientation of its antennas even as it moves. Because of the use of sectorized antennas, an idle node can listen for incoming transmissions on all its antennas and a transmitting node can send a packet in all directions by transmitting on all its antennas. This protocol uses an omni-directional RTS message when the transmitting node wants to send a message and then intended destination responds with a CTS message, also sent omni-directionally. The destination node records which sector it received the RTS message from by determining which antenna had the strongest signal and the source node uses the same technique on the CTS message to determine which sector the destination node is in. Because the nodes are assumed to be mobile, the information about which sector to use is only remembered for transmitting a single packet.

In the Rotational Sector Receive Protocol each node in the network is equipped with one RF transceiver and one antenna. The antenna can be used to transmit and receive either omni-directionally or directionally (see Somprakash Bandyopadhyay, Dola Sana, Siuli Roy, Tetsuro Ueda, Tetsuro Ueda, and Shinsuke Tanaka, "A Network-Aware MAC and Routing Protocol for Effective Load Balancing in Ad Hoc Wireless Networks with Directional Antenna", *ACM MobiHoc* 2003, June 2003). When idle, the node defaults to its omni-directional sensing mode and on sensing a packet it switches to a rotational sector receive mode. In rotational mode, the antenna switches sequentially in 45 degrees increments covering the entire 360 degree space around the node.

To locate a particular neighbor, the initiator node transmits each control packet with a 200 microsecond signal tone that precedes the control packet. On sensing the tone, the destination node switches its antenna to rotational mode and receives the tone directionally in all possible directions. The node examines the signal strength in the different directions and settles on the direction which provides the maximum signal strength. It then sets its beam in that direction for receiving the subsequent data reception. The duration of the tone is long enough to allow the destination node to rotate its beam through 360 degrees and receive the tone in each of its distinct directions. Once the location is determined, the node stores the information in its Active Node List (ANL). Every node periodically broadcasts the ANL omni-directionally, preceded by the tone signal. This helps to maintain the validity of location information in the nodes' location cache. An RTS/CTS (Request to Send/Clear to Send) exchange containing the direction of transmission occurs over the omni-directional antenna to inform the neighbors about the impeding communications and reduce the possibility of packet collisions.

Here, the protocol only provides for the case where the sender is transmitting and the receiver is idling. That is, the receiver is listening in an omni-directional way. Not accounted for is the case where the receiver may be busy in an on-going communication. In such a case the receiver would not be able to hear and respond to its neighbor's discovery message and would therefore not be discovered. In addition, the protocol suffers from a constant overhead. When the receiver hears the initial tone, a full 200 microseconds have to pass before the actual control packet can be heard. Another significant disadvantage of this approach is that it only enables neighbor discovery between nodes that are in omni-directional range of each other. Therefore, it does not enable the longer-range communication that should be possible using directional antennas.

In the Circular RTS Protocol (see T. Korakis, G. JakIlari, and L. Tassiulas "A MAC Protocol for Full Exploitation of Directional Antennas in Ad-hoc Wireless Networks", *ACM Mobihoc* 2003, June 2003) each node in the network is equipped with one RF transceiver and one antenna that can receive omni-directionally or directionally, but can only transmit directionally. No other details of the antenna are specified for this protocol. The model is that omni-directional transmissions are achieved with successive sequential directional transmissions. On packet reception, the node is able to use selection diversity, defined as the capability to ascertain the direction from which the packet arrived. Selection diversity is assumed possible by selecting the combination of antenna elements which sense the maximum signal power. Although this antenna model is not a traditional sectorized antenna, it has many similarities.

In this protocol the transmitter begins by consecutively sending an RTS packet, once in each of the possible directions, in a predefined sequence, covering the entire area around the node. Each of the neighboring nodes receives this RTS in an omni-directional manner. On receiving the RTS, the destination node uses selection diversity to determine the direction of the transmitter and points its antenna towards the transmitter. The destination node waits for the transmitter to complete its transmission of the circular RTS and then responds by sending a CTS in the direction of the RTS transmitter. The RTS transmitter hears the CTS in an omni-directional fashion and, using selection diversity, determines the direction from which the CTS packet arrived. It then points its antenna beam in that direction. Once the direction of the transmitter and the receiver are known the nodes preserve these locations in a "Location Table".

Here, the protocol makes strong assumptions about antenna technology. For example, the protocol relies heavily on selection diversity and negligible switching times. It is not clear how easy it is to implement selection diversity with omni-directional antennas. Additionally, this protocol does not provide for the case when the beam switching time is non negligible. Although slow a switching time is less of a concern in a simple discovery protocol, when the discovery protocol is tied in with the MAC (Media Access Control), as in this scheme, switching times can affect performance. Another weakness of the proposed scheme is the fine time synchronization requirement needed for coordinating the completion of the directional circular RTS with the subsequent CTS response. The destination node determines when the RTS will end by examining the beam number (1 . . . M) which is included as part the RTS packet. Yet another issue is that this protocol does not address the case of asymmetric links. Also, the protocol considers non-overlapping directions for antenna beams. In practice this is almost never achievable. Protocol modifications are necessary when this requirement cannot be met strictly. Another significant disadvantage of this approach is that the protocol does not enable communication between two nodes where the only way they can communicate is through directional transmission and directional reception when both antennas are aimed correctly.

The UDAAN Discovery Protocol (see Ram Ramanathan, Jason Redi, Cesar Santivanez, David Wiggins, Stephen Polit "Ad Hoc Networking with Directional Antennas: A Complete System Solution", *IEEE Journal on Selected Areas in Communications*, vol. 23, no. 3, March 2005) does not make a distinction between switched beam and steerable directional antenna, labeling both beam forming (BF) antenna. This protocol considers a mixed node network, where nodes are capable of: a) receiving and transmitting omni-directionally only (N-BF); b) transmitting directionally, but receiving omni-directionally (T-BF); and c) transmitting and receiving directionally (TR-BF).

Each node in the network broadcasts a "hello" message periodically. A node learns about the existence of another nodes by hearing these heartbeat messages. In the case of N-BF, this reduces to a traditional neighbor discovery technique. For T-BF and TR-BF, the protocol describes two discovery methods: informed discovery and blind discovery. The difference between the two has to do with whether or not the node knows about the existence of the destination node. For informed T-BF and TR-BF, the node sends a directional heartbeat, containing its own location, by pointing its antenna in the approximate direction of where it thinks the destination node is. The target node receives the heartbeat in a omni-directional manner, determines the position of the sending node from the message, and then sends its own heartbeat towards the initiating node. For blind T-BF discovery, the node scans through all possible directions, sending a heartbeat in each direction at pre-defined time intervals. When the target receives this message, it starts the informed T-BF process with the initiator of the blind heartbeat. In accomplishing neighbor discovery with blind TR-BF, the protocol requires that the clocks on all nodes be synchronized, possibly with a common clock source such as GPS (Global Positioning System). Periodically all nodes engage in blind TR-BF discovery at the same time. A direction is chosen based on the time and each node alternates randomly between sending a heartbeat in that direction and listening in the opposite direction for such heartbeats. After one complete cycle, all TR-BF neighbors are discovered. Blind TR-BF discovery only works in two dimensions.

As can be seen, due to the high complexity and high cost of the antenna hardware or operation of the above neighbor discovery protocols, each leaves much to be desired. Accordingly, a need exists for a method that efficiently and effectively enables a node to determine the relative location of its neighboring nodes—nodes that are directly reachable via a single hop—in a mesh network. The invention provides such a method. These and other advantages of the invention, as well as additional inventive features, will be apparent from the description of the invention provided herein.

SUMMARY OF THE INVENTION

In view of the foregoing, the present invention provides a Neighbor Location Discovery Protocol (NLDP) that determines the relative location of the nodes in a mesh network. In one embodiment, the Neighbor Location Discovery Protocol of the present invention is designed for an ad-hoc wireless network where the nodes are equipped with directional antennas and are not able to use GPS. The protocol disclosed offers significant advantages over previously proposed protocols as a consequence of the difference in hardware configuration of the router nodes. While NLDP relies on nodes having at least two RF transceivers, previous protocols employ only one RF transceiver.

A tradeoff exists between antenna complexity, speed of convergence, and number of transceivers. In NLDP antenna hardware is simple, easy to implement, and readily available. Further, NLDP exploits the host node's ability to operate simultaneously over non-overlapping channels to quickly converge on the neighbor's location. Unlike some of the previous proposals, there is no fixed penalty associated with a single radio solution for discovering new neighbors. Finally, once a node has been located, multiple transceivers offer the possibility of informing "future" destination nodes to point their directional antenna at the sender, even while the sender and the future destination node are pointing their antennas in different directions and are engaged in communication with other nodes.

NLDP is limited by the range of the control channel, which operates in a omni-directional fashion. However, by choosing a low frequency band, high power, and low data rate, the omni-directional range of the control channel can be increased to match (or be greater) than the range on the data channel when properly aimed directional antennas are used by both the transmitter and the receiver. As a final consideration, additional transceivers can cause power drain on the node, however in scenarios such as the community networking scenario, battery capacity is not and issue. This is due to the fact that routers can be placed in neighborhood houses near an infinite power source (an electric outlet).

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
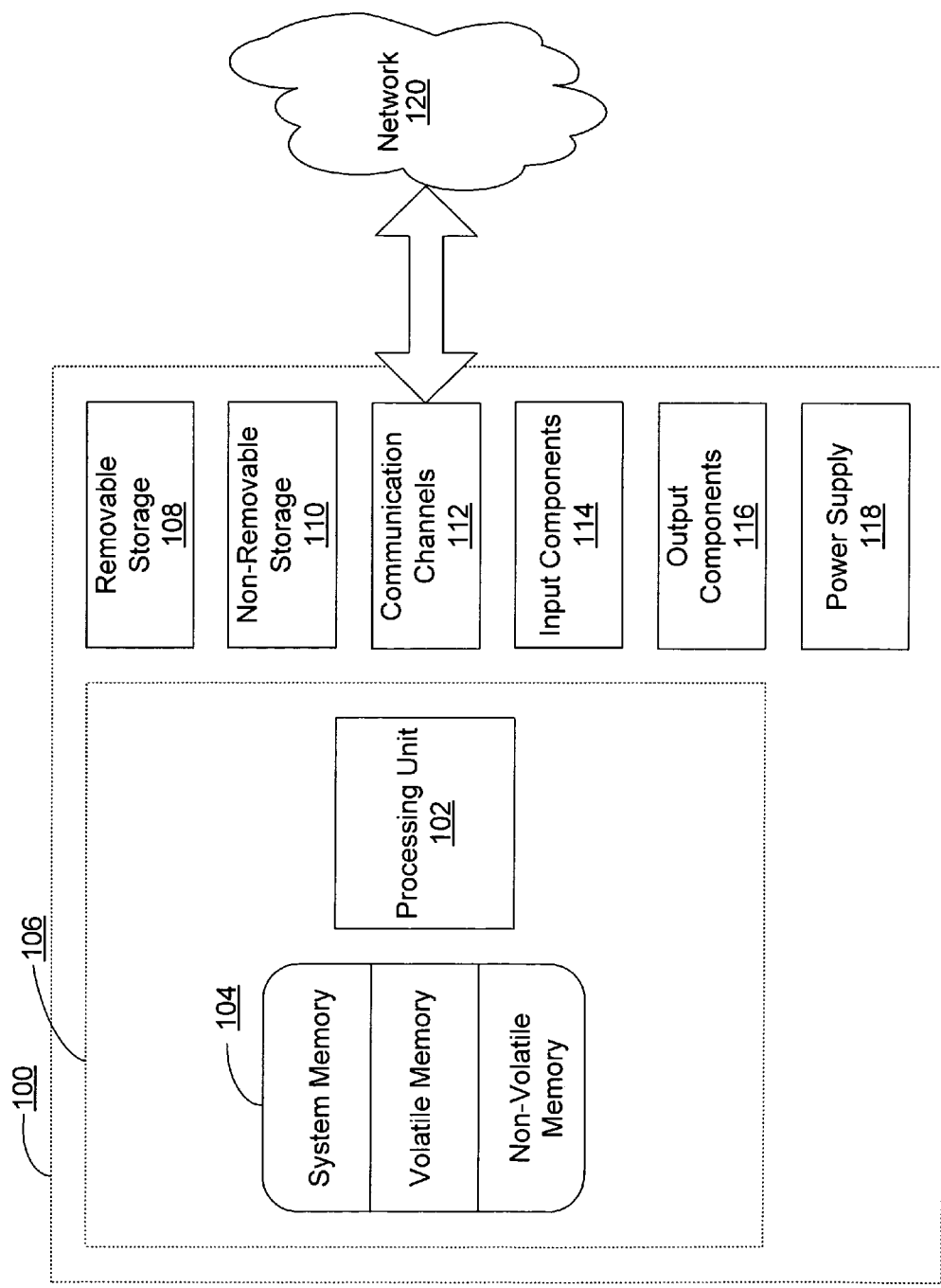
FIG. 1 is a schematic diagram of an exemplary computer architecture on which the neighbor location discovery protocol of the present invention can be implemented.
Figure 2:
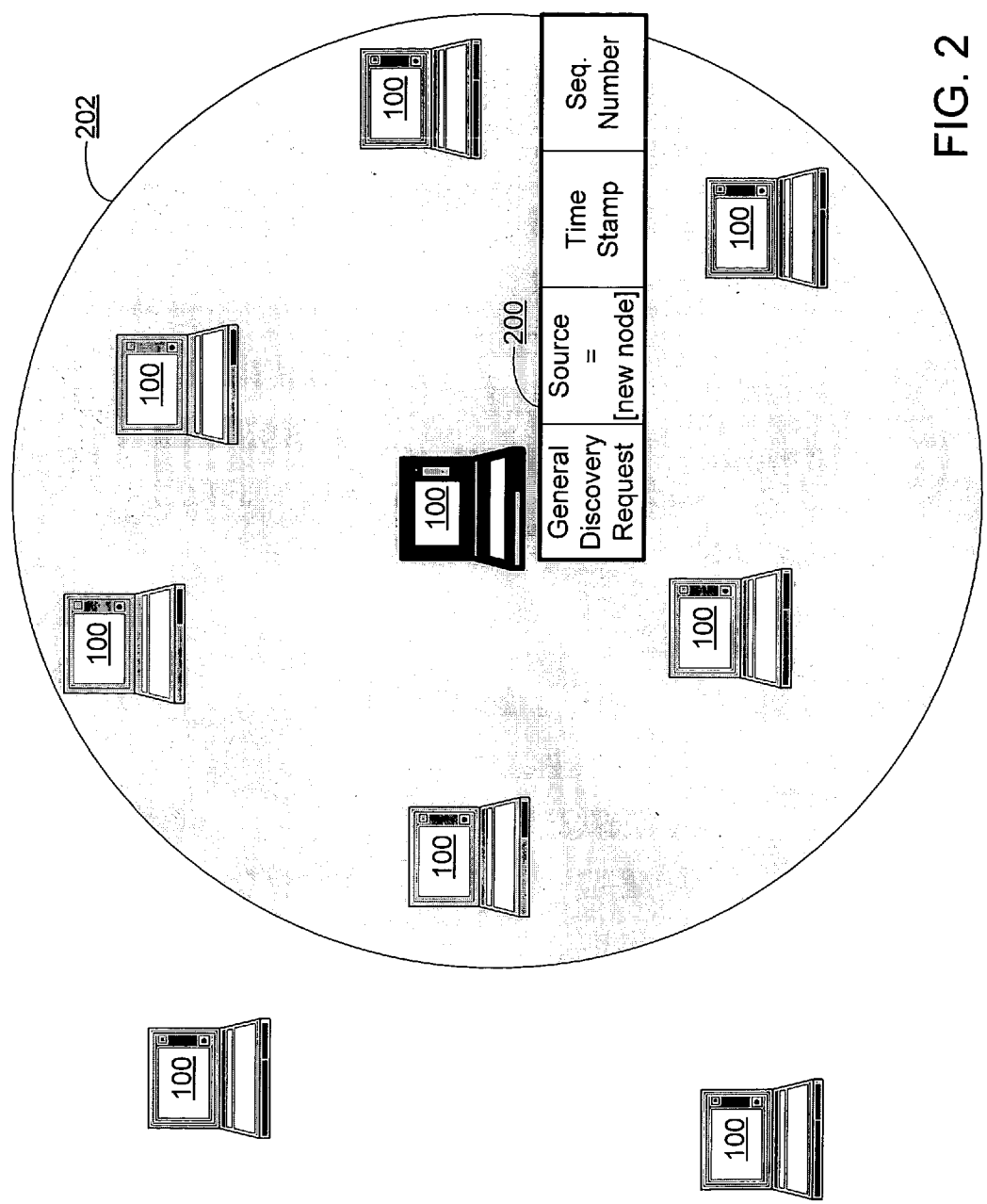
FIG. 2 is a schematic diagram illustrating the initial steps in the process of searching for neighbors utilizing the neighbor location discovery protocol of the present invention.
Figure 3:
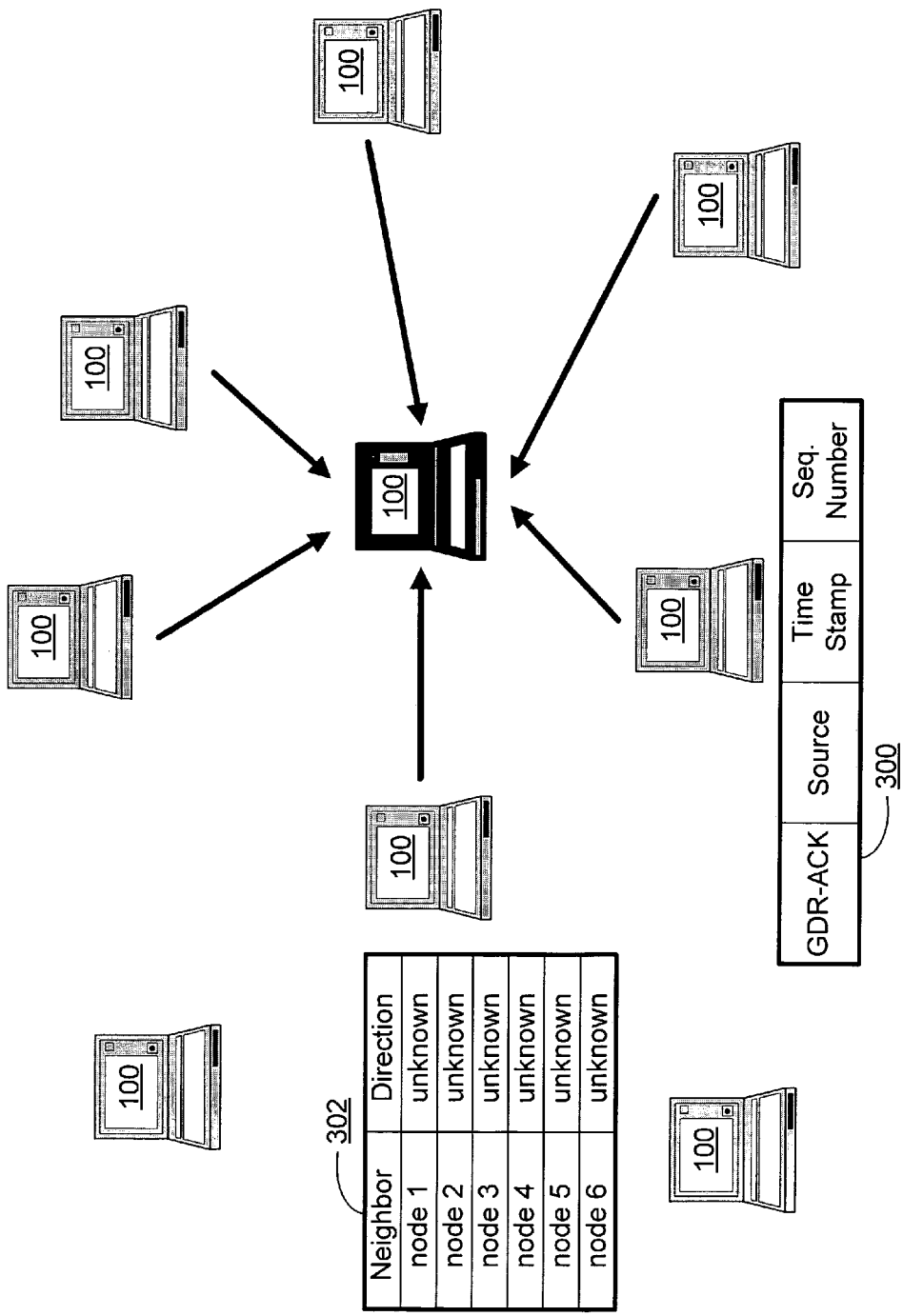
FIG. 3 is a schematic diagram illustrating the final steps in the process of searching for neighbors utilizing the neighbor location discovery protocol of the present invention.
Figure 4:
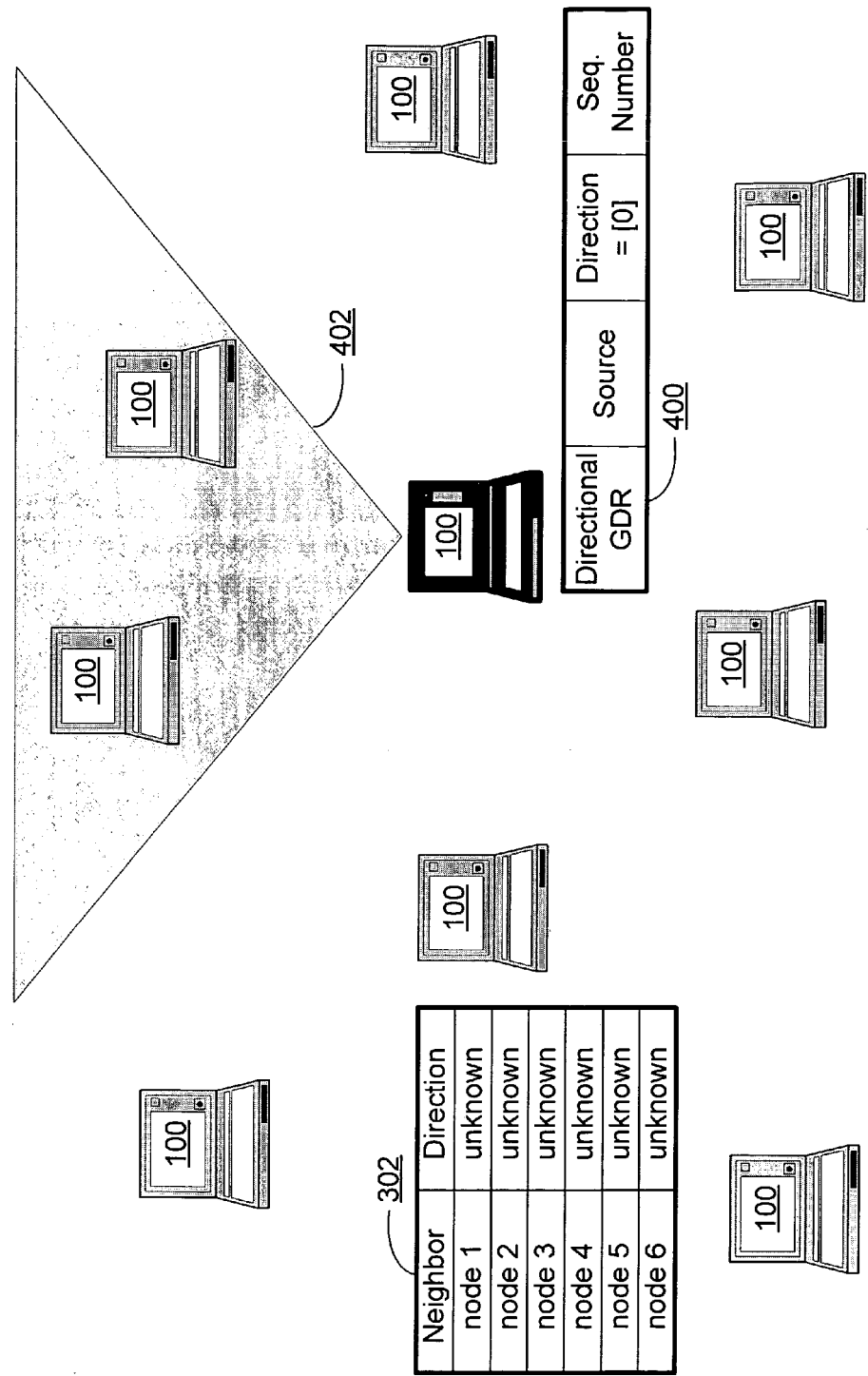
FIG. 4 is a schematic diagram illustrating the initial steps in the process of finding directions for neighbors utilizing the neighbor location discovery protocol of the present invention.
Figure 5:
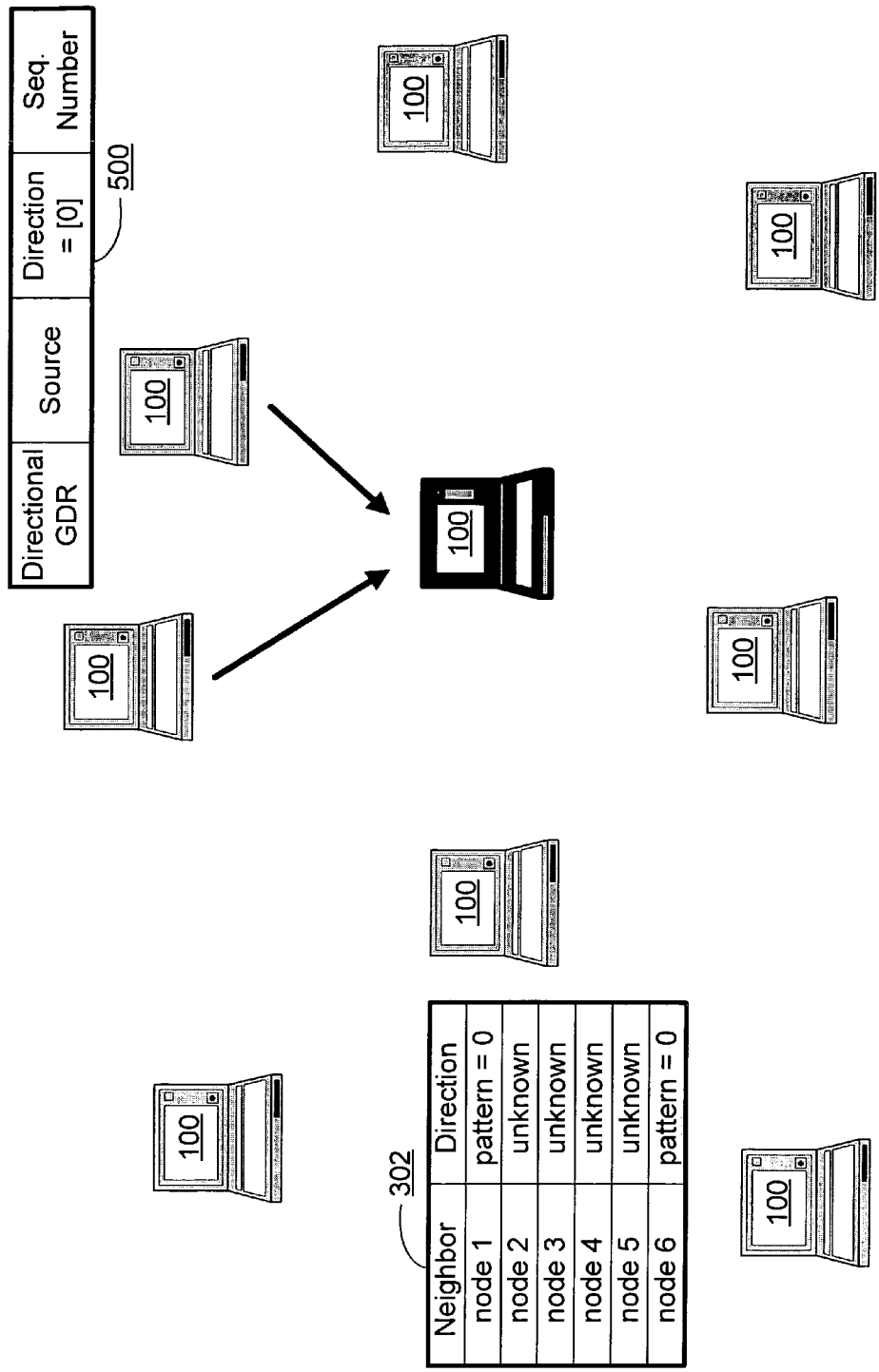
FIG. 5 is a schematic diagram illustrating the final steps in the process of finding directions for neighbors utilizing the neighbor location discovery protocol of the present invention.
Figure 6:
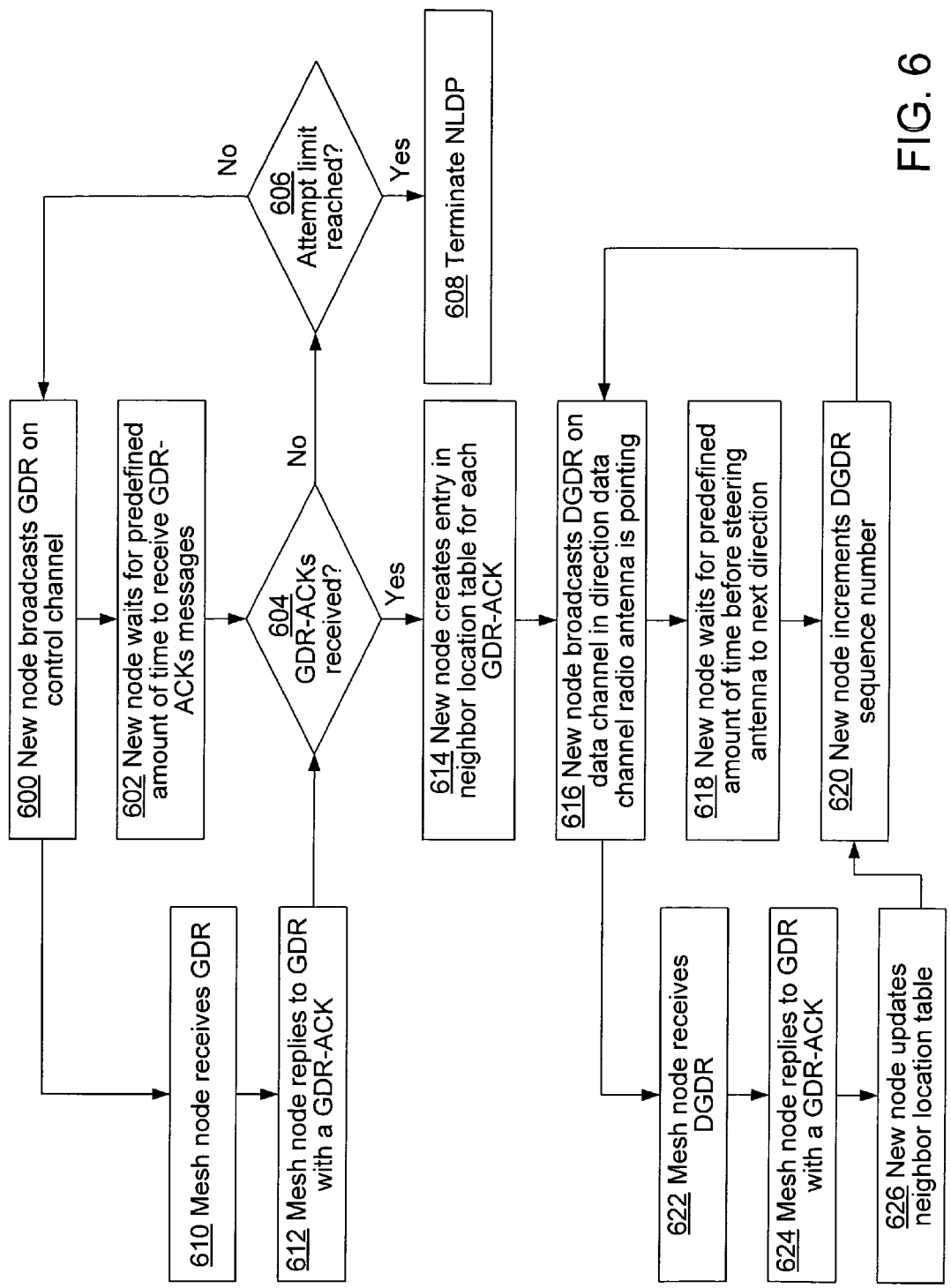
FIG. 6 is a flowchart illustrating the neighbor location discovery protocol of the present invention.

In the description that follows, the invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the computing device in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that several of the acts and operations described hereinafter may also be implemented in hardware.

Turning to the drawings, wherein like reference numerals refer to like elements, the invention is illustrated as being implemented in a suitable computing environment. The following description is based on illustrated embodiments of the invention and should not be taken as limiting the invention with regard to alternative embodiments that are not explicitly described herein.

I. Exemplary Environment

Referring to FIG. 1, the present invention relates to communications between network nodes on connected computer networks. Each of the network nodes resides in a computing device that may have one of many different computer architectures. For descriptive purposes, FIG. 1 shows a schematic diagram of an exemplary architecture usable for these devices. The architecture portrayed is only one example of a suitable environment and is not intended to suggest any limitation as to the scope of use or functionality of the invention. Neither should the computing devices be interpreted as having any dependency or requirement relating to any one or combination of components illustrated in FIG. 1. The invention is operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing device 100 typically includes at least one processing unit 102 and memory 104. The memory 104 may be volatile (such as RAM), non-volatile (such as ROM and flash memory), or some combination of the two. This most basic configuration is illustrated in FIG. 1 by the dashed line 106.

Computing device 100 can also contain storage media devices 108 and 110 that may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing device.

Computing device 100 can also contain communication channels 112 that allow it to communicate with other devices. The computing device 100 may also have input components 114 such as a keyboard, mouse, pen, a voice-input component, and a touch-input device. Output components 116 include screen displays, speakers, printers, and rendering modules (often called "adapters") for driving them. The computing device 100 has a power supply 118. All these components are well known in the art and need not be discussed at length here.

II. Node Configuration

The present invention is directed to a Neighbor Location Discovery Protocol (NLDP) that determines the relative location of computing device nodes in a mesh network. Before describing NLDP, the hardware configuration of each node in the mesh network will first be described.

Each node in the network is configured with at least two radio frequency (RF) transceivers. One or more of these transceivers operate in a high frequency band (e.g., the 5 GHz band) and one operates in a low frequency band (e.g., 700 MHz band). These transceivers are designated as data channel radios and a control channel radio respectively. Every node is capable of communicating simultaneously over these channels.

The control channel radio operates in a omni-send-omni-receive (OSOR) mode and the data channel radio operates in one of two modes: a directional-send-omni-receive (DSOR) mode; or a directional-send-directional-receive (DSDR) mode. The range of the control channel radio in OSOR mode is greater than or equal to the range of the data channel radio in DSOR or DSDR mode. This requirement is ensured by managing the transmission power appropriately and by noting that RF signals propagate much further in lower frequency bands than in the higher frequency bands.

The directional antenna on the data channel is steerable in increments of K degrees each. A beamwidth of W degrees is assumed and it is desirable that K<W. Further, it is assumed that steering the directional antenna is moderately expensive and each movement of K degrees takes $T_{steer}$ milliseconds to complete.

The control channel requires very little spectrum (e.g., 1 to 2 MHz) compared to the data channel (e.g., 200 MHz for all data channels, and 20 MHz per data channel). Consequently, the control channel transmission rate is significantly lower (e.g., 1 Mbps) than the data channel transmission rate (e.g., up to 54 Mbps). Since RF transceivers are capable of operating at any of several different data rates (e.g., 6, 9, 12, 18, 24, 36, 48, and 54 Mbps), the range of the radios is measured at a fixed transmission rate. Hence, it is not necessary to deal with channels whose range changes due to dynamic changes in the data rate.

In one of several possible embodiments of the present invention, a Carrier Sense Multiple Access (CSMA) MAC is used for the control and the data channel. It should be noted however, that NLDP is not limited by the choice of the MAC. Additionally, although a common configuration for the mesh router nodes would use three RF transceivers, for correct operation the protocol of the present invention can be implemented with only two transceivers—one for the control channel and one for the data channel. Consequently, the protocol is described as being implemented with two transceivers only.

III. Neighbor Location Discovery Protocol

As an initial matter, it is worth pointing out that the NLDP is described herein with respect to neighbor location discovery. Once the location of the neighbors has been determined, it is the routing protocol that ultimately determines where the antennas should point at any given point in time. Initially NLDP is described for nodes using a DSOR configuration (directional-send omni-directional receive), and then it is extended to handle DSDR configurations as well (directional-send directional-receive).

Typically, a new node joining the mesh network will initiate neighbor location discovery as part of its setup. A node that is already a member of the mesh, may initiate neighbor location discovery when: a) it overhears a new node not already in its table of neighbors and wants to locate it; or b) an entry in its neighbor location table (described below) expires. An expiration triggers a targeted neighbor discovery for that node. The expiration times are randomized to prevent simultaneous expiration of several entries.

Each mesh node maintains a neighbor location table, which contains information for neighboring nodes. Each neighbor is identified by a node ID, which may be one or more of: DNS name, IP address, MAC address, etc. Associated with the node ID is the direction in which the antenna must point to send data to this node. The direction is a numerical value that represents the number of consecutive switches the antenna must make, from its base position, in the clockwise direction to reach the particular neighbor. The entry also contains a timestamp indicating the time when this neighbor was last involved in successful communications with host node. Entries in the neighbor location table expire if there has not been any activity with the neighbor for a predetermined amount of time. Sample contents of a neighbor location table are shown below in Table 1.

TABLE 1

Sample Neighbor Location Table

| Neighbor Mesh ID | Neighbor MAC | Direction | Last Seen |
| --- | --- | --- | --- |
| 0x34 | 00-08-02-09-9E-AC | 3 | 13:06:29 |
| 0x44 | 00-08-02-09-54-34 | 5 | 13:02:40 |

The first record in Table 1 can be interpreted such that node 0x34 is reachable by steering the antenna 3 times from the default base position. The record also indicates that the last time node 0x34 was "seen" was at 1:06:29 P.M. It should be noted that when the node has more than one data channel radio, the table is augmented with a column that contains the transceiver-antenna pair identifier (e.g., 2) via which a neighboring node is reachable.

NLDP employs seven messages in its operation. General Discovery Request (GDR) is a broadcast message sent on the control channel. It contains the node ID of the sender, a local timestamp, and a request sequence number. The request sequence number is incremented every time the node sends a GDR message. GDR-ACK is a unicast message sent on the control channel. Each node that receives a GDR replies back with a GDR-ACK. The GDR-ACK contains the echo of the timestamp and round number from the GDR message. It also contains node ID information of the node sending the GDR-ACK.

Targeted Discovery Request (TDR) is a unicast message sent on the control channel. This message is similar to GDR except, it is used to locate a specific node. It should be noted that TDR can be sent only if the ID of the target is already known. There is no TDR-ACK message because it is assumed that the control-channel supports MAC-level acknowledgements.

Directional General Discovery Request (DGDR) is a broadcast message sent on the data channel with the antenna pointed in some direction. This message can be sent only after sending a GDR message, and receiving at least one GDR-ACK. The message contains a node ID, a timestamp, and a sequence number that increments with every DGDR or DTDR message sent by this node. DGDR-ACK is a unicast message sent on the control channel in response to a DGDR message. The message contains an echo of all the data from the DGDR message, as well as the ID of the node sending this DGDR-ACK.

Directional Targeted Discovery Request (DTDR) is a unicast message sent on the data channel to a specific target. It is similar to DGDR, except it is sent after a TDR message. DTDR-ACK is a unicast message sent on the control channel in response to a DTDR message. The message format is similar to DGDR-ACK. Table 2 below summarizes which messages are sent on which channels.

TABLE 2

Protocol Messages on Different Channels

| Control Channel Messages | GDR, GDR-ACK, TDR, DGDR-ACK, DTDR-ACK |
|---|---|
| Data Channel Messages | DGDR, DTDR |

The NLDP protocol works in two phases. In Phase 1, it determines the existence of neighboring nodes. In Phase 2, it determines the location of these nodes. Due to the fact that the protocol utilizes two RF transceivers operating on different frequency bands with different ranges, it is possible that a neighboring node may be discovered, but may not be reachable.

Turning to FIGS. 2, 3, 4, and 5 an exemplary community mesh network with many nodes is illustrated. In the case of a new node (shown in the figures as the bolded node) seeking to join the mesh, the new node's directional antenna is pointed in some arbitrary direction. On joining the network, the new node goes through the sequence of events illustrated in FIGS. 2, 3, 4, 5, and 6.

Phase 1, determining the existence of neighbors, begins with step 600 when the new node 100 broadcasts a GDR message 200 on the control channel 202. After sending the GDR message 200, the new node 100 in step 602 then waits for predefined amount of time, $T_{bdgrWait}$, to receive the GDR-ACKs messages 300. Next, at step 604, the new node 100 retransmits the GDR message 200 if no GDR-ACKs 300 are received during this time. This is repeated for a specified number of times in step 606 before the new node 100 terminates the discovery protocol in step 608. To protect itself from spurious duplications or late GDR-ACKs 300, the new node 100 discards any GDR-ACKs 300 received after $T_{bdgrWait}$ amount of time since the GDR message 200 was sent. Sequence numbers can be used to disregard any GDR-ACKs 300 from previous GDR messages 200 that show up during this wait period. Upon receiving the GDR message 200 in step 610, a mesh node 100 replies with a GDR-ACK message 300 in step 612. Since GDR-ACKs 300 are unicast, it can be assumed that the control channel MAC automatically attempts to resolve and retransmit the collisions. Continuing with step 614, for each GDR-ACK 300 it receives, the new node 100 creates an entry in its neighbor location table 302. All values except the antenna direction are filled at this point. The antenna direction is entered as unknown.

Phase 2, determining the location of the neighboring nodes, begins with step 616 when, after waiting for $T_{bdgrWait}$ time, the new node 100 broadcasts a directional DGDR message 400 on the data channel 402, in the direction the data channel radio antenna is pointing. Since the DGDR message 400 is broadcast, it is afforded only a limited amount of collision avoidance and there is likely no automatic retransmission. Once again, like the GDR messages 200, the node 100 can do its own higher-level retransmissions if needed. This is potentially complicated by the fact that there really might not be any nodes 100 in this sector. After sending the DGDR message 400, in step 618 the new node 100 waits for a time $T_{gndrWait}$ before steering the antenna to the next direction. Next, in step 620 the new node 100 then increments the DGDR sequence number and repeats the broadcast process.

Continuing with step 622, any node 100 that receives a DGDR message 400 responds in step 624 with a DGDR-ACK 500 on the control channel 202. The DGDR-ACK message 500 is unicast to the new node 100, and once again the new node 100 can rely on the usual MAC-level mechanisms to partially guarantee the delivery. Once the DGDR-ACK 500 arrives, the new node 100 updates its neighbor location table 302 in step 626. The DGDR-ACKs 500 carry the echo of the sequence number of the DGDR message 400, so the new node 100 will always know what DGDR message 400 (and hence which way the antenna was pointing) this DGDR-ACK 500 corresponds to. Thus, DGDR-ACKs 500 can arrive in any order. This also allows the responding node 100 to take its own time to send DGDR-ACKs 500. Here, a timeout is not necessary since the acceptance of DGDR-ACKs 500 for very old GDRs 200 that may have been sent is not desirable. If it is assumed that the current time is t, it can be proposed that the new node 100 should update its neighbor location table 302 with any DGDR-ACK 500 that carries a sequence number less than the current DGDR sequence number, and whose timestamp indicates that it was sent no later than t−3* $(T_{gndrWait}+T_{steer})$.

Once the new node 100 has gone through the whole rotation of the antenna (i.e., a full 360 degrees), it should fill up many of the entries in the neighbor location table 302. Any remaining entries will preferably be discarded at this point. This is due to the fact that the control channel 202 range in the OSOR mode can be greater than the data channel 402 range in the DSOR mode. Thus, the possibility exists that GDR-ACKs 300 from nodes 100 where there is no hope of ever communicating with on the data channel 402 could be received. There is a risk of throwing away some neighbors 100 who by chance never managed to get their DGDR-ACK 500 through, but that possibility is negligible. Furthermore, this discovery process can be done periodically at which point the nodes 100 who never managed to get their DGDR-ACK 500 through in the previous round are likely to be discovered.

Each node 100, which receives a DGDR message 400 from the new node 100, looks into its own neighbor location table 302 to see if it knows how to transmit to the new node 100. If no entry exists for the new node 100, an entry is created with the antenna direction set to unknown. In either case, the node 100 must initiate its own targeted discovery process to figure out how to communicate with the new node 100. This is done as follows: assuming that a node 100 has just received a DGDR 400 from the new node 100 and has responded with DGDR-ACK 500, the node 100 is now trying to locate the new node 100. The node 100 will wait until it is ready to initiate the discovery. Since the discovery can potentially require steering the antenna, it will break any ongoing communication. The node 100 should instead wait until there is a lull in the traffic before it initiates the discovery. There is a tradeoff here; finding direction to the new node 100 might potentially lead to new and better routes, however ongoing communications might suffer in the process.

Now the node 100 sends a TDR message on the control channel 202. It should be noted that since this message is unicast, the underlying MAC retransmission mechanisms will aid to achieve a higher degree of reliability in the delivery. However, if so desired, an additional retransmission mechanism on top can be added. It should also be noted that there is no need for a TDR-ACK message, if it is assumed that the control channel MAC sends MAC-level ACKs. If transmission of TDR is successful, the node 100 sends a DTDR message. If the position of the antenna to transmit to the new node 100 is known, that sector can be tried first, otherwise, a full rotating search similar to DGDR is carried out.

The NLDP protocol described above is designed for a DSOR configuration—it does not handle the directional send-directional receive (DSDR) case. The reason for this is that whenever a node sends a DGDR or DTDR message, the assumption is that the receiver can receive that message. In a DSDR configuration, it must be ensured that the receiver has its antenna pointed in the correct direction in order to receive the discovery request.

To handle this case, the following changes can be made. First, the neighbor location table can be modified to contain two directions: a send direction and a receive direction. In the common case, these two directions will be the same, but there is no guarantee that this will always be the case. The discovery protocol can also be modified by dividing it into "rounds" where, within a single round, the discovering node repeatedly broadcasts DGDR messages and rotates its antenna to the next position after sending each DGDR message, while the intended recipients all hold their antenna directions constant. A round ends when the discovering node has rotated a full 360 degrees, at which point the discovering node then broadcasts a NEXTROUND message on the control channel to indicate to all the intended recipients that they should rotate their antennas to the next position. If K is the number of degrees that a node rotates its antenna, then there will be 360/K rounds needed before the discovery process finishes, and within each round the discovering node sends out 360/K DGDR messages. As was the case with the DSOR version of NLDP, the discovery messages contain a sequence number that the sender (i.e. the discovering node) uses to determine which direction its antenna was pointing when it sent the DGDR message. When the recipient receives a DGDR message, it also records the direction that its antenna was pointing in the "receive direction" field of its neighbor table, and it responds on the control channel with a DGDR-ACK message that contains the sender's sequence number so that the sender can record which "send direction" it was pointing in when the DGDR message was successfully delivered. As with the previous DSOR protocol, this protocol also supports targeted discovery with DTDR messages. As before, the key differences between DGDR and DTDR are that the DTDR and the NEXTROUND messages are not broadcast and that only a single intended recipient node is rotating its antenna on receipt of each NEXTROUND message.

This protocol assumes that the range of the data channel operating in DSDR will be less than or equal to the range of the control channel operating in OSOR node. If this is not the case, then NLDP will not discover certain nodes that could potentially use DSDR to communicate.

In view of the many possible embodiments to which the principles of this invention may be applied, it should be recognized that the embodiments described herein with respect to the drawing figures are meant to be illustrative only and should not be taken as limiting the scope of invention. For example, for performance reasons the method of the present invention may be implemented in hardware, rather than in software. Therefore, the invention as described herein contemplates all such embodiments as may come within the scope of the following claims and equivalents thereof.

What is claimed is:

1. A method for discovering neighbor locations in a mesh network, comprising:

joining the mesh network by a new network node having a data channel radio that operates on a high frequency band and a control channel radio that operates on a low frequency band, a range of a control channel on the control channel radio being equal to or greater than a range of a data channel on the data channel radio;

discovering, in a first phase, the existence of neighbor nodes, the first phase including, broadcasting, over the control channel on the control channel radio, via an omnidirectional control channel antenna, a general discovery request message by the new network node;

receiving, at the new network node, a first acknowledgement message over the control channel from a second network node in the mesh network in response to the general discovery request message and creating a corresponding entry in a neighbor location table;

discovering, in a second phase, the locations of the neighbor nodes which were discovered in the first phase, the second phase including, broadcasting, over the data channel on the data channel radio via a directional data channel antenna, a directional general discovery request message having a sequence number, in a direction corresponding to a current direction of the data channel antenna;

rotating the data channel antenna after broadcasting the directional general discovery request message;

repeating the broadcasting of the directional general discovery request message and the rotating of the data channel antenna until a complete rotation is achieved;

broadcasting a next round message on the control channel and repeating the broadcasting of the directional general discovery request message and the rotating of the data channel antenna after broadcasting of the directional general discovery request message;

receiving a second acknowledgement message from the second network node with the sequence number; and updating the corresponding entry in the neighbor location table with neighbor location information according to the sequence number, the sequence number used to determine the direction of the data channel antenna when the corresponding directional general discovery request message was broadcast.

2. A method as defined in claim 1, further comprising:

waiting, by the new network node, for a period of time after broadcasting the general discovery request message; and re-broadcasting, over the control channel, the general discovery request message by the new network node if no acknowledgement messages are received at the new network node during the period of time.

3. A method as defined in claim 1, further comprising repeating the waiting and the re-broadcasting for a specified number of iterations before terminating discovery of neighbor locations.

4. A method as defined in claim 1, further comprising discarding, by the new network node, any acknowledgement messages having a sequence number matching a sequence number of an earlier general discovery request message received by the new network node after the period of time.

5. A method as defined in claim 1, further comprising:
sending, by the new network node, a unicast targeted discovery request message on the control channel;
sending, by the new network node, a unicast directional targeted discovery request message on the data channel;
receiving an acknowledgement message in response to the directional targeted discovery request message over the control channel; and
updating an entry in the neighbor location table.

6. A method as defined in claim 1, wherein each entry in the neighbor location table contains a send direction antenna pattern and a receive direction antenna pattern.

7. A computer-readable storage medium having encoded thereon computer-executable instructions for performing the method of claim 1 on a computer device.

* * * * *